No. 630,691. Patented Aug. 8, 1899.
W. B. HARTRIDGE.
APPARATUS FOR MANUFACTURING FUEL BLOCKS.
(Application filed Dec. 23, 1897.)

(No Model.) 2 Sheets—Sheet 1.

Witnesses:
James R. Mansfield
Wm C Sullivan

Inventor:
William B. Hartridge
By his attorneys
Alexander & Dowell

THE NORRIS PETERS CO., PHOTO-LITHO., WASHINGTON, D. C.

No. 630,691. Patented Aug. 8, 1899.
W. B. HARTRIDGE.
APPARATUS FOR MANUFACTURING FUEL BLOCKS.
(Application filed Dec. 23, 1897.)
(No Model.) 2 Sheets—Sheet 2.

UNITED STATES PATENT OFFICE.

WILLIAM B. HARTRIDGE, OF LONDON, ENGLAND.

APPARATUS FOR MANUFACTURING FUEL-BLOCKS.

SPECIFICATION forming part of Letters Patent No. 630,691, dated August 8, 1899.

Application filed December 23, 1897. Serial No. 663,276. (No model.)

*To all whom it may concern:*

Be it known that I, WILLIAM B. HARTRIDGE, a citizen of England, residing at 28 Victoria street, Westminster, London, England, have invented new and useful Improvements in Apparatus for the Manufacture of Fuel-Blocks, of which the following is a specification.

My invention relates to improvements in apparatus for the manufacture of fuel-blocks, whereby they may be formed of short prisms or cylinders longitudinally and transversely perforated.

The mixture to be operated upon, which may consist of some carbonaceous or combustible material, is forced through a die by means of a reciprocating plunger, which is provided with a central rod or mandrel projecting from it, thereby extruding a prismatic or cylindrical column perforated longitudinally by the mandrel. While the extruded portion of this column rests for a time beyond the die, transverse holes are punched through it by reciprocating punches having their operation timed to that of the plunger. The column is divided into lengths, each constituting a longitudinally and transversely perforated block which may be used alone as fuel.

The invention therefore consists in certain novel details of construction and combination of parts, as will be more fully hereinafter described and claimed.

A convenient form of duplex apparatus for the manufacture of blocks as above described is represented in the accompanying drawings, of which—

Figure 1:
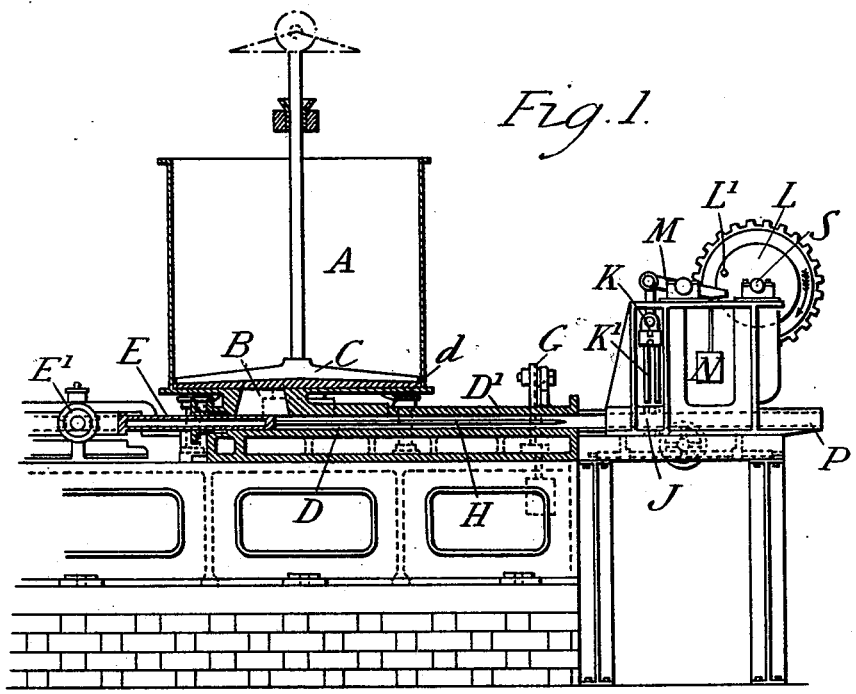
Figure 2:
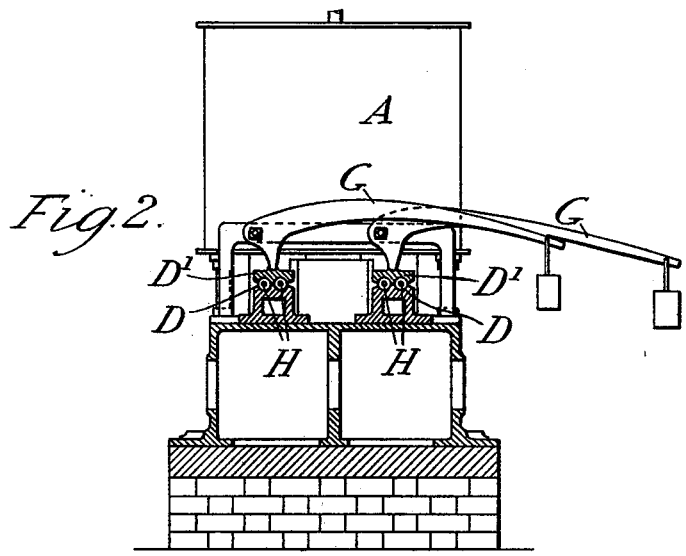
Figure 3:
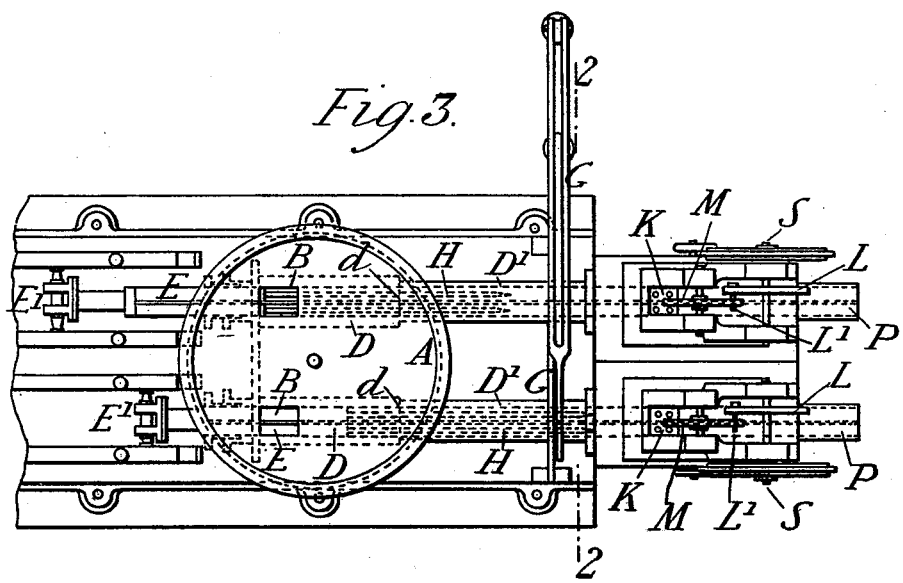

Figure 1 is a side elevation, partly sectional; Fig. 2, a transverse section on the line 2 2 of Fig. 3, which is a plan.

A is a pugging-cylinder, within which revolves a vertical shaft carrying inclined arms C, that sweep over two rectangular holes B, each of which opens from the bottom of the cylinder into a pair of molds D, which may be of rectangular, polygonal, or circular section to suit the desired form of fuel-block. The front portion of each mold is divided horizontally into two halves, the upper half D' being hinged at $d$ to the rear part of the mold and being pressed down by a loaded lever G, making the mouth and front part of the mold somewhat smaller than the rear part. Within the two molds of each pair are plungers E, having guided heads E', each connected to two opposite cranks on a revolving shaft, so that the two pairs of plungers reciprocate always in opposite directions. Each pair of plungers, to each of which is attached a mandrel H, in making its back stroke retreats behind the hole B, leaving it open, and the arm C sweeps into the molds D a charge of the material from the pugging-cylinder A, which is the mixture of combustible matter and agglutinant above referred to. The plungers E as they advance force these charges along the molds, pushing previous charges onward and causing the foremost of these to be extruded from the mouth of the mold each as a block readily separable from the block behind it. During the retreat of the plunger the extruded block remains for a time at rest in front of the mold, and during this time, while in position J, it is perforated by several punches K', attached to a head K, vertically guided in a framing on which is mounted a shaft S, carrying a sprocket-wheel driven by a chain from the crank-shaft that works the plungers D, so that the two shafts revolve uniformly together. The punch-block K is linked to one arm of a lever M, the other arm of which carries a weight N to retract the punches. On the shaft S are wheels L, each of which has projecting from it a stud L'. As each of these wheels revolves in the direction of the arrow its stud L' raises the loaded arm of the lever M, thus forcing the punches through the pair of fuel-blocks that are lying side by side under the punches, and when the stud has passed the lever the weight N causes that arm of the lever to descend, raising the other arm and the punches which it carries. Each block after being punched is pushed onward by succeeding blocks to a shelf P, whence it can be removed to be dried.

Having thus described the nature of this invention and the best means I know for carrying the same into practical effect, I claim—

1. In an apparatus for manufacturing longitudinally and transversely perforated fuel-blocks, a mold and plunger reciprocating therein, and a mandrel attached to the plunger so as to perforate the fuel-block longitudinally; in combination with the verticallysliding punches moved so as to punch the fuel-block transversely by mechanism timed to the movement of the plunger.

2. The combination of the pugging-cylinder, a mold beneath the same, a plunger in said mold provided with elongated perforating-mandrels, the upper portion of said mold being hinged, and a weighted lever for depressing this movable portion of the mold; with vertically-movable punches opposite the end of the mold beneath which the blocks are brought as extruded from the mold, the lever for operating said punches provided with a weight for retracting them, and a cam-shaft adapted to engage said levers so as to cause the punches to perforate the block.

3. The combination of the pugging-cylinder A, the mold D having an opening B and the hinged part D', the weighted lever G for depressing said hinged part, and the reciprocating plunger E in said mold provided with the long mandrels H; with the vertically-movable punches K' opposite the end of the mold, the oscillating lever M provided with the weight N, and the shaft S provided with the cam-disk L for operating said lever, for the purpose and substantially as described.

In testimony whereof I have signed my name to this specification, in the presence of two subscribing witnesses, this 5th day of January, A. D. 1898.

WILLIAM B. HARTRIDGE.

Witnesses:
OLIVER IMRAY,
JNO. P. M. MILLARD.